(12) United States Patent
Yagiura

(10) Patent No.: US 10,334,135 B2
(45) Date of Patent: Jun. 25, 2019

(54) IMAGE PROCESSING APPARATUS, IMAGE PROCESSING SYSTEM, AND IMAGE PROCESSING METHOD

(71) Applicant: Yutaka Yagiura, Kanagawa (JP)

(72) Inventor: Yutaka Yagiura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/696,234

(22) Filed: Sep. 6, 2017

(65) Prior Publication Data

US 2018/0084140 A1 Mar. 22, 2018

(30) Foreign Application Priority Data

Sep. 16, 2016 (JP) ................. 2016-182377
Jul. 11, 2017 (JP) ................. 2017-135387

(51) Int. Cl.
*H04N 1/32* (2006.01)
*H04N 1/00* (2006.01)

(52) U.S. Cl.
CPC ....... *H04N 1/32112* (2013.01); *H04N 1/0023* (2013.01); *H04N 1/00344* (2013.01); *H04N 1/32523* (2013.01); *H04N 2201/0039* (2013.01); *H04N 2201/0094* (2013.01); *H04N 2201/3222* (2013.01)

(58) Field of Classification Search
None
See application file for complete search history.

(56) References Cited

U.S. PATENT DOCUMENTS

| 2007/0165265 | A1 | 7/2007 | Ito et al. |
| 2007/0297666 | A1 | 12/2007 | Takeuchi et al. |
| 2008/0239387 | A1* | 10/2008 | Otsuka ................ G06F 3/1204 358/1.15 |
| 2011/0063639 | A1 | 3/2011 | Yagiura |
| 2011/0222112 | A1 | 9/2011 | Yagiura et al. |
| 2014/0082747 | A1 | 3/2014 | Negoro et al. |
| 2014/0149976 | A1 | 5/2014 | Yagiura et al. |
| 2017/0140225 | A1 | 5/2017 | Yagiura |

FOREIGN PATENT DOCUMENTS

| JP | 2007-241515 | 9/2007 |
| JP | 2015-012336 | 1/2015 |
| JP | 2016-068499 | 5/2016 |

* cited by examiner

*Primary Examiner* — Lennin R Rodriguezgonzalez
(74) *Attorney, Agent, or Firm* — Harness, Dickey & Pierce, P.L.C.

(57) ABSTRACT

An image processing apparatus connected to an external apparatus via a network, includes: a network interface to receive an output-target file and an output setting file from the external apparatus, the output setting file associating file identification information for identifying the output-target file with setting information to be set when the output-target file is output; and circuitry to set an output setting in accordance with the setting information associated with the file identification information of the output-target file, and to output the output-target file in accordance with the output setting that is set.

14 Claims, 17 Drawing Sheets

FIG. 6

| FILE NAME | COLOR | REDUCE/ ENLARGE | NUMBER OF COPIES | RESOLU- TION | TRAY | 2-SIDED/ 1-SIDED | SORT/STACK |
|---|---|---|---|---|---|---|---|
| LeafletA.pdf | FULL COLOR | 100% | 100 | 600 dpi | AUTO | 1-SIDED | NO |
| LeafletB.pdf | FULL COLOR | 50% | 200 | 600 dpi | AUTO | 2-SIDED | NO |
| LeafletC.pdf | MONOCHROME | 100% | 200 | 600 dpi | AUTO | 2-SIDED | NO |
| FolderA | MONOCHROME | 100% | 100 | 600 dpi | AUTO | 1-SIDED | NO |

FIG. 12

| ITEM | SPECIFIC CONTENT |
|---|---|
| COMMAND | "ACQUISITION OF FILE LIST" |
| FOLDER NAME | "¥¥192.168.0.1¥SharedFiles¥POPFiles" |
| USER ID (AUTHENTICATION INFORMATION) | "userB" |
| PASSWORD (AUTHENTICATION INFORMATION) | "password" |

FIG. 13

| ITEM | DATA TYPE | SPECIFIC CONTENT |
|---|---|---|
| TYPE | FLAG | FOLDER/PRINT-TARGET FILE |
| NAME | CHARACTER | "¥¥192.168.0.1¥SharedFiles¥POPFiles¥LeafletA.pdf" |
| ACCESS PERMISSION INFORMATION | FLAG | READ AND WRITE/READ/ACCESS PROHIBITED |
| OWNER | CHARACTER | "userB" |
| CREATION DATE/TIME | INTEGER | 2016/02/25/13:00:05 |
| SIZE (BYTES) | INTEGER | 1048576 |

FIG. 14

| TYPE | NAME | ACCESS PERMISSION INFORMATION | OWNER | CREATION DATE/TIME | SIZE |
|---|---|---|---|---|---|
| SPECIFIED FOLDER | "¥¥192.168.0.1 ¥SharedFiles¥POPFiles¥" | READ AND WRITE | — | 2016/01/15/9:00:00 | 0 |
| FILE | "¥¥192.168.0.1 ¥SharedFiles¥POPFiles ¥LeafletA.pdf" | READ AND WRITE | userB | 2016/02/25/13:00:05 | 1048576 |
| FILE | "¥¥192.168.0.1 ¥SharedFiles¥POPFiles ¥LeafletB.pdf" | READ | userB | 2016/03/14/18:50:00 | 2359296 |
| FILE | "¥¥192.168.0.1 ¥SharedFiles¥POPFiles ¥LeafletC.pdf" | READ AND WRITE | userC | 2016/03/18/17:20:00 | 156380 |
| FOLDER | "¥¥192.168.0.1 ¥SharedFiles¥POPFiles ¥FolderA" | READ AND WRITE | userA | 2016/02/01/11:00:00 | 0 |

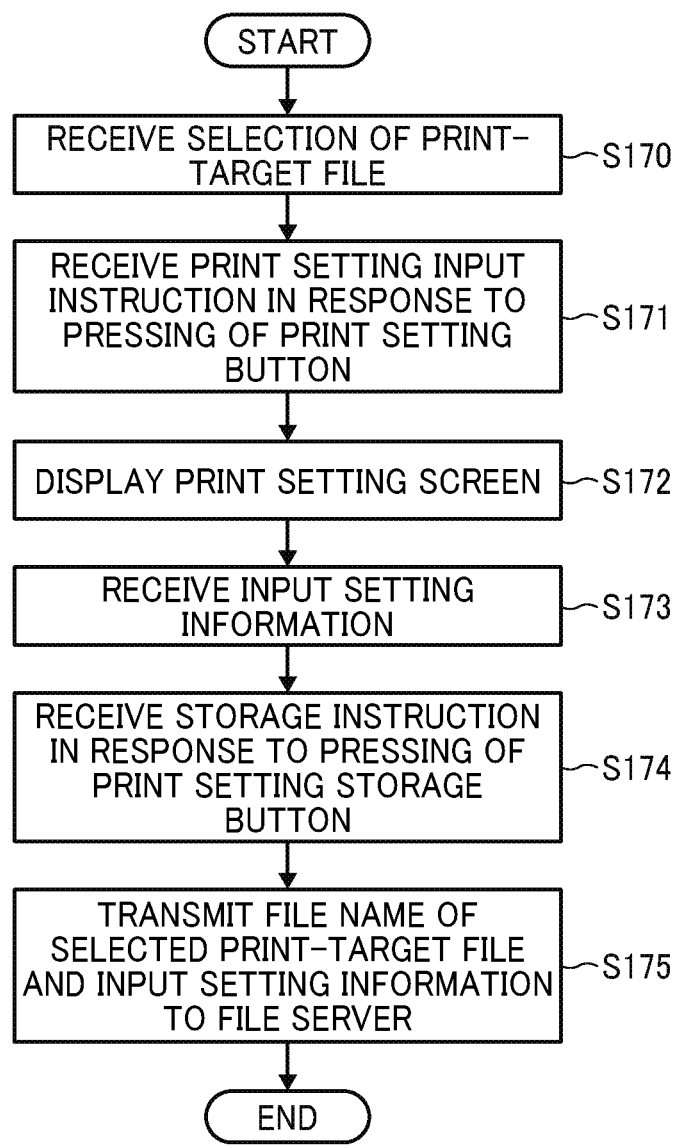

IMAGE PROCESSING APPARATUS, IMAGE PROCESSING SYSTEM, AND IMAGE PROCESSING METHOD

CROSS-REFERENCE TO RELATED APPLICATIONS

This patent application is based on and claims priority pursuant to 35 U.S.C. § 119(a) to Japanese Patent Application No. 2016-182377, filed on Sep. 16, 2016 and Japanese Patent Application No. 2017-135387, filed on Jul. 11, 2017, in the Japan Patent Office, the entire disclosure of which is hereby incorporated by reference herein.

BACKGROUND

Technical Field

The present invention relates to an image processing apparatus, an image processing system, and an image processing method.

Description of the Related Art

For example, in the case of multi-store operations of chain stores such as food supermarkets, printed material such as an advertisement is sometimes distributed to the chain stores. Typically, a file created at the head office is uploaded to a dedicated file server or online storage on the cloud, and the file is printed using printers at the individual chain stores.

In such a case, at each of the chain stores, the file is downloaded using an information processing terminal such as a personal computer (PC) and is printed using a printer. Alternatively, a printer accesses the online storage to acquire the file and then prints an image based on the file (which is referred to as pull printing).

There are cases where, for example, a specific print-target file (output-target file) is desirably printed using predetermined print settings (output settings) regarding color, stapling, and use of thick paper, etc. Even in such cases, in systems that use the pull printing function of the related art, the print settings need to be set separately in individual image processing apparatuses that acquire the print-target file before the print-target file is printed.

SUMMARY

Example embodiments of the present invention include an image processing apparatus connected to an external apparatus via a network, including: a network interface to receive an output-target file and an output setting file from the external apparatus, the output setting file associating file identification information for identifying the output-target file with setting information to be set when the output-target file is output; and circuitry to set an output setting in accordance with the setting information associated with the file identification information of the output-target file, and to output the output-target file in accordance with the output setting that is set.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is an illustration of an example of a data structure of the print setting file;

FIG. 12 is an explanatory diagram of authentication information, a name of a specified folder, and a file list acquisition request that are transmitted to the file server by the MFP;

FIG. 13 is an explanatory diagram of a file list received by the MFP from the file server;

FIG. 14 is an explanatory diagram of a file list transmitted to the MFP by the file server;

FIG. 18 is a flowchart illustrating the print-setting-file storage process performed by the MFP according to the embodiment.

Figure 1:
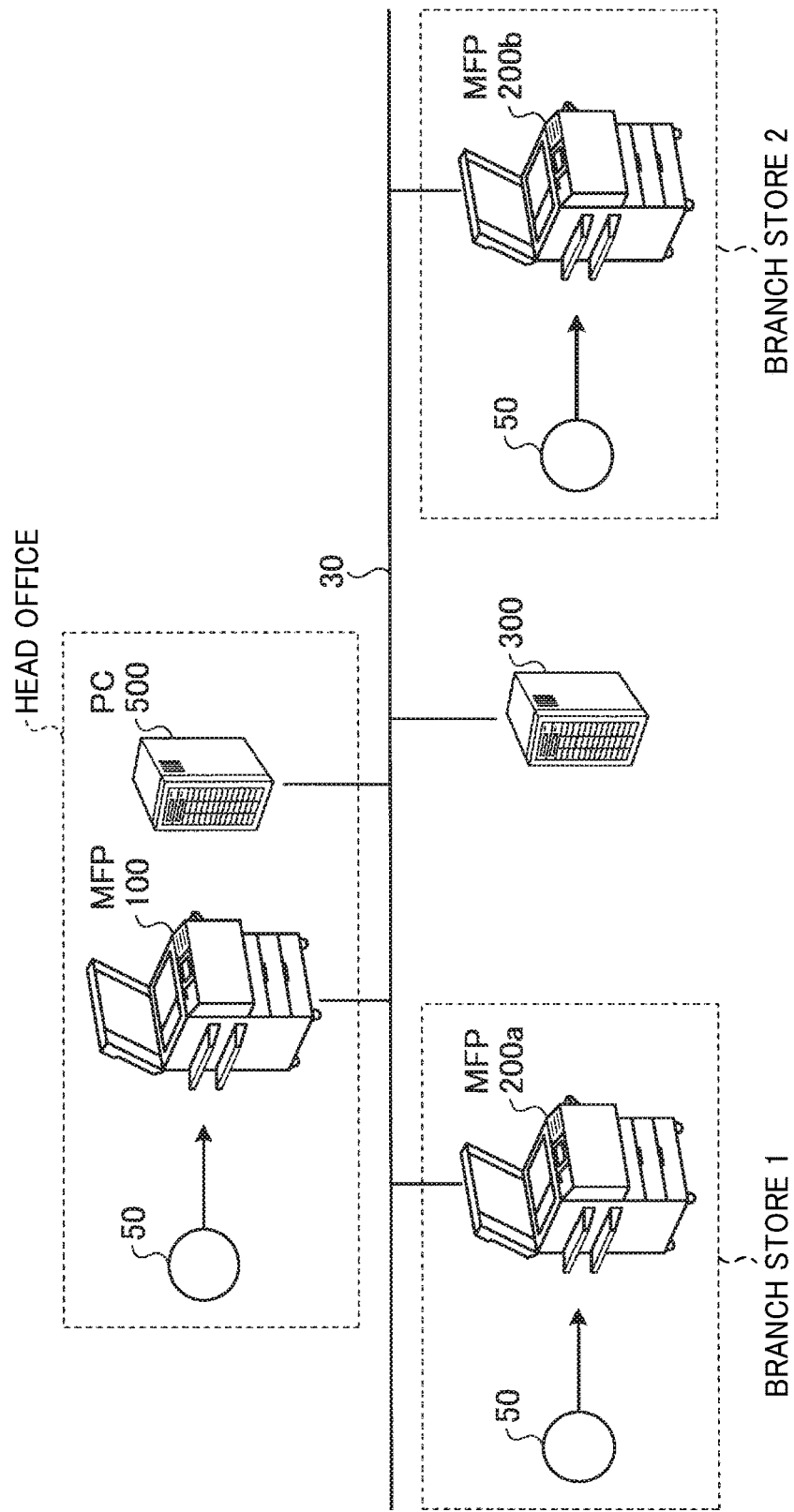
FIG. 1 is a diagram illustrating the overview of a configuration of an image processing system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of an image processing apparatus, an image processing system, and a recording medium will be described in detail below with reference to the accompanying drawings.

FIG. 1 is a diagram illustrating the overview of a configuration of an image processing system according to an embodiment. As illustrated in FIG. 1, the image processing system includes MFPs 100, 200a, and 200b, a file server 300, and a PC 500, which are connected to one another via a network 30. For example, Server Message Block (SMB), which is widely used as a network file sharing protocol, is used in communications performed among the MFPs 100, 200a, and 200b, the file server 300, and the PC 500.

FIG. 1 illustrates an example in which the MFP 100 and the PC 500 are provided at a head office, the MFP 200a is provided at a first branch store 1, and the MFP 200b is provided at a second branch store 2. The image processing system according to the embodiment illustrated in FIG. 1 performs printing using the pull printing function. Specifically, the MFP 200a at the first branch store 1 and the MFP 200b at the second branch store 2 download a print-target file (Word, PDF, or JPEG file, for example) stored in a folder (Google Drive (registered trademark) or Dropbox (registered trademark), for example) of the file server 300 to acquire the print-target file. The MFP 200a at the first branch store 1 and the MFP 200b at the second branch store 2 then print the acquired print-target file.

Specifically, the image processing system can be used in the following case. For example, by using the PC 500, the user at the head office creates a print-target file of a point-of-purchase (POP) advertisement and stores the print-target file in the file server 300. Then, the users at the first and second branch stores 1 and 2 acquire the print-target file from the file server 300 by using the MFPs 200a and 200b, respectively, and put the printed advertisements at the respective stores. In this way, the common advertisements can be put at the individual stores.

In the embodiment, after the print-target file created by using the PC 500 is stored in the file server 300, print settings for the print-target file are also stored in the file server 300 by using the MFP 100 or the PC 500 at the head office. It is assumed that these print settings are print settings desirably used when the print-target file is printed by using the MFPs 200a and 200b at the first and second branch stores 1 and 2, respectively. The MFPs 200a and 200b at the first and second branch stores 1 and 2, respectively, acquire the print-target file and the corresponding print settings, and print the print-target file in accordance with the print settings stored in the file server 300 in advance.

Each of the MFPs 100, 200a, and 200b is an apparatus having various functions such as a copier function, a scanner function, a fax function, and a printer function. Each of the MFPs 100, 200a, and 200b is an example of an image processing apparatus. In the image processing system illustrated in FIG. 1, three MFPs 100, 200a, and 200b are connected to one another. However, the number of MFPs may be any number. That is, the image processing system may include one, two, or four or more MFPs. In addition, a printing application (hereinafter, referred to as a "printing app") 50 is installed on each of the MFPs 100, 200a, and 200b. In the following description, the MFP 200a or 200b is sometimes referred to as an MFP 200 to represent an MFP at any given branch store.

The printing app 50 is software for providing a function of printing (an example of outputting) a print-target file (an example of an output-target file) of image data or a document on a recording medium such as paper by using the functions of the MFP 100 or 200. The printing app 50 is, for example, a Java (registered trademark) application that runs on Android (registered trademark) executed in an operation unit 20 (see FIG. 3, etc.). In this embodiment, the printing app 50 is an application that is installed on the operation unit 20 of the MFPs 100 and 200 and that runs on an operating system of the operation unit 20. However, if the printing app 50 is a web application that resides on the cloud, the printing app 50 may be a web application that is caused to run on a cloud server via a browser application installed on the operation unit of each MFP. The printing app 50 is an example of an output application that provides a function of outputting the output-target file. Examples of outputting of a print-target file other than printing include sending an email attached with the print-target file, transferring the print-target file, and faxing the print-target file.

The PC 500 generates a print-target file to be printed by the MFPs 100 and 200. As described above, the PC 500 generates a print-target file of image data or a document serving as a POP advertisement or the like. The PC 500 then transmits the generated print-target file to the file server 300.

The file server 300 is an apparatus that stores a print-target file of an image or a document that has been generated by the PC 500 and has a format printable by the MFPs 100 and 200 and stores information relating to the print-target file, such as a print setting file that stores print settings for the print-target file. The file server 300 is an example of an external apparatus. The file server 300 is an apparatus that transmits a print-target file and a print setting file in response to a request from the MFP 100 or 200. Details of the print setting file 15 will be described later.

Figure 2:
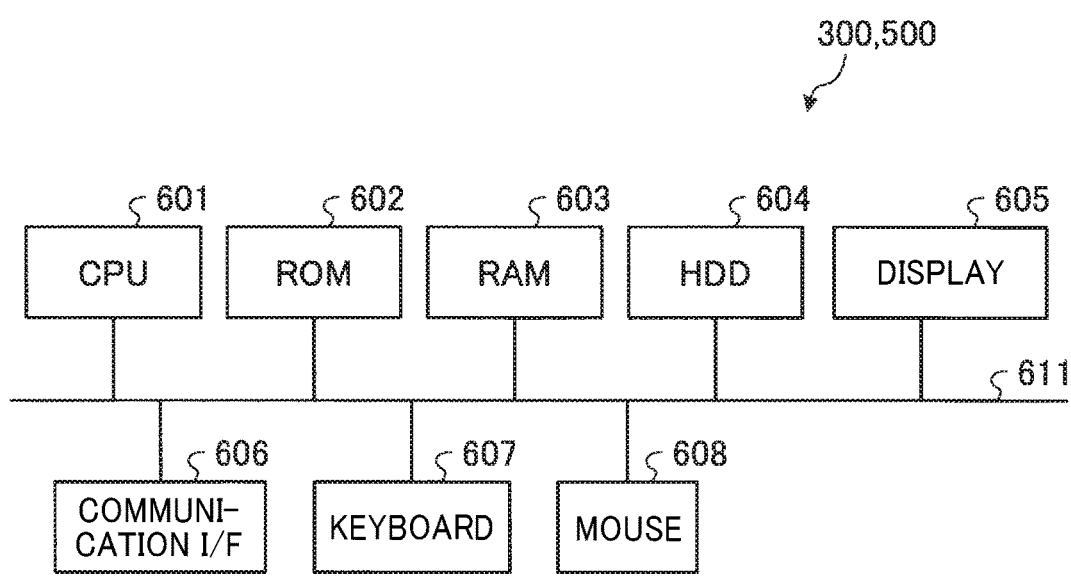
FIG. 2 is a block diagram illustrating an example of a hardware configuration of a file server and a PC according to the embodiment.

Hardware configurations of the file server 300 and the PC 500 will be described next. FIG. 2 is a block diagram illustrating an example of the hardware configurations of the file server 300 and the PC 500 according to the embodiment. Although the file server 300 is described below, the description also applies to the PC 500.

As illustrated in FIG. 2, the file server 300 includes a central processing unit (CPU) 601, a read-only memory (ROM) 602, a random access memory (RAM) 603, a hard disk drive (HDD) 604, a display 605, a communication interface (I/F) 606, a keyboard 607, and a mouse 608.

The CPU 601 controls operations of the file server 300. Specifically, the CPU 601 executes, by using the RAM 603 as the work area, programs stored in the ROM 602 or the HDD 604 to control the operations of the file server 300.

The display 605 is a display device that displays various kinds of information using text and images. The display 605 may be, for example, a cathode ray tube (CRT) display, a liquid crystal display (LCD), or an organic electro-luminescence (EL) display.

The communication I/F 606 is an interface that connects the file server 300 to the network 30 to perform data communication. The communication I/F 606 may be, for example, an Ethernet-based interface of 10 Base-T, 100 Base-TX, or 1000 Base-T.

The keyboard 607 is an input device used for inputting characters and numerals and selecting any of various instructions, for example. The mouse 608 is an input device used for selecting and executing any of various instructions and for selecting a processing target, for example.

The CPU 601, the ROM 602, the RAM 603, the HDD 604, the display 605, the communication I/F 606, the keyboard 607, and the mouse 608 are connected to one another via a bus 611, such as an address bus or a data bus, to be able to perform communication with one another.

Figure 3:
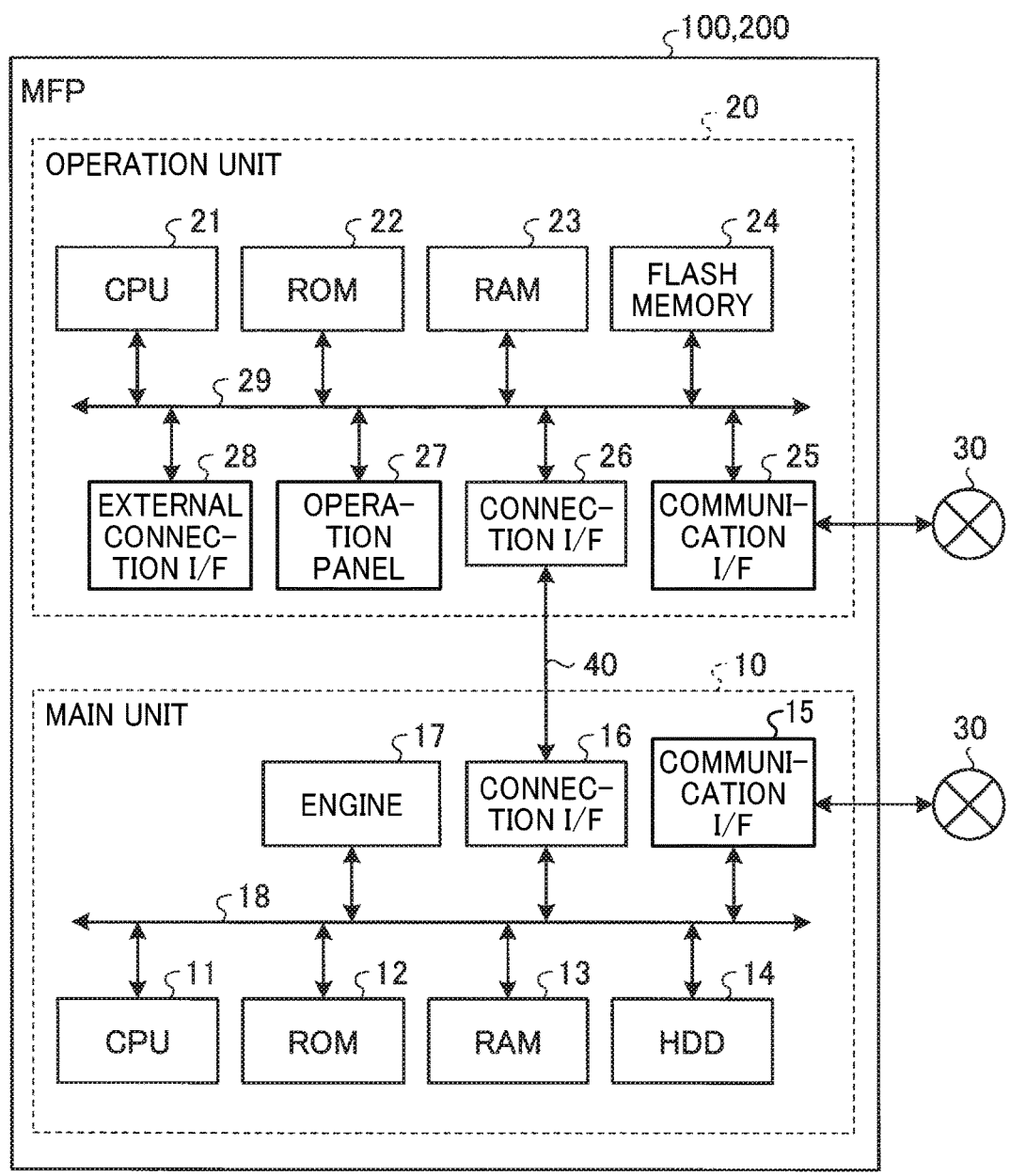
FIG. 3 is a block diagram illustrating an example of a hardware configuration of a multifunction peripheral (MFP) according to the embodiment.

A hardware configuration of the MFPs 100 and 200 will be described next. FIG. 3 is a block diagram illustrating an example of the hardware configuration of the MFPs 100 and 200 according to the embodiment. As illustrated in FIG. 3, each of the MFPs 100 and 200 includes a main unit 10 and the operation unit 20. The main unit 10 is capable of implementing various functions, such as a copier function, a scanner function, a fax function, and a printer function. The operation unit 20 receives an input operation performed by the user and sends an operation instruction to the main unit 10.

Note that receiving an input operation performed by the user refers to a concept including receiving information (including a signal representing coordinate values on the screen) that is input in accordance with the input operation performed by the user. The main unit 10 and the operation unit 20 are connected to each other via a dedicated communication channel 40 to be able to communicate with each other. As the communication channel 40, for example, a communication channel based on the Universal Serial Bus (USB) standard can be used. However, the communication channel 40 may be based on any standard of wired or wireless communication.

Note that the main unit 10 is capable of performing an operation according to an input operation received by the operation unit 20. The main unit 10 is also capable of communicating with an external apparatus, such as the file server 300, and is capable of performing an operation according to an instruction received from the external apparatus.

An example of the hardware configuration of the main unit 10 will be described first. As illustrated in FIG. 3, the main unit 10 includes a CPU 11, a ROM 12, a RAM 13, an HDD 14, a communication I/F 15, a connection I/F 16, and an engine 17, which are connected to one another via a system bus 18.

The CPU 11 integrally controls operations of the main unit 10. Specifically, the CPU 11 executes, by using the RAM 13 as the work area (workspace), programs stored in the ROM 12 or the HDD 14 to control the operations of the main unit 10 and consequently implement the aforementioned various functions, such as a copier function, a scanner function, a fax function, and a printer function.

The communication I/F 15 is an interface for connecting the main unit 10 to the network 30. The connection I/F 16 is an interface that allows the main unit 10 to communicate with the operation unit 20 via the communication channel 40.

The engine 17 is hardware that performs processing for implementing the copier function, the scanner function, the fax function, and the printer function (examples of output functions) other than general information processing and communication. For example, the engine 17 includes a scanner (image scanner) that scans an image on an original to read the image, a plotter (image former) that performs printing on a recording medium such as a sheet, and a fax that performs fax communication. The engine 17 may further include a specific optional component, such as a finisher that sorts recording media for which printing has been finished, or an auto document feeder (ADF) that automatically feeds the originals.

An example of the hardware configuration of the operation unit 20 will be described next. As illustrated in FIG. 3, the operation unit 20 includes a CPU 21, a ROM 22, a RAM 23, a flash memory 24, a communication I/F 25, a connection I/F 26, an operation panel 27, and an external connection I/F 28, which are connected to one another via a system bus 29.

The CPU 21 integrally controls operations of the operation unit 20. Specifically, the CPU 21 executes, by using the RAM 23 as the work area (workspace), programs stored in the ROM 22 or the flash memory 24 to control the operations of the operation unit 20 and consequently implement various functions (described later), such as displaying information (image) according to an input received from the user.

The communication I/F 25 is an interface for connecting the operation unit 20 to the network 30. The connection I/F 26 is an interface that allows the operation unit 20 to communicate with the main unit 10 via the communication channel 40. The external connection I/F 28 is an interface that allows connection of an integrated card (IC) card reader, for example.

The operation panel 27 receives various inputs according to user operations and displays various kinds of information (information according to a received input operation and various screens, for example). In this example, the operation panel 27 includes an LCD having a touch panel function. However, the configuration of the operation panel 27 is not limited to this configuration. For example, the operation panel 27 may include an organic EL display device having a touch panel function. Further, in addition to or in place of the touch-panel-function-equipped display device, the operation panel 27 may include operation keys such as hardware keys and a display component such as a lamp. The operation panel 27 is an example of a display.

Note that software installed on the main unit 10 and software installed on the operation unit 20 are different from each other in this embodiment in order to keep the functions of the main unit 10 and the functions of the operation unit 20 independent from each other. That is, the main unit 10 and the operation unit 20 operate independently from each other on different operating systems (OS). For example, Linux (registered trademark) may be used as software installed on the main unit 10, and Android (registered trademark) may be used as software installed on the operation unit 20. The operating system of the main unit 10 is an example of a first operating system, and the operating system of the operation unit 20 is an example of a second operating system. The printing app 50 is an application that runs on the operating system of the operation unit 20.

As described above, the main unit 10 and the operation unit 20 operate based on different operating systems in each of the MFPs 100 and 200 according to the embodiment. Therefore, communication performed between the main unit 10 and the operation unit 20 is not inter-process communication within a single apparatus but is communication between different apparatuses. An operation (command communication) for transferring information (content of an instruction from the user) received by the operation unit 20 to the main unit 10 and an operation for sending an event notification to the operation unit 20 from the main unit 10 correspond to this communication.

The operation unit 20 performs command communication to the main unit 10. Consequently, the function of the main unit 10 can be used. In addition, examples of an event notification sent from the main unit 10 to the operation unit 20 include an operation status in the main unit 10 and content of a setting set in the main unit 10.

Figure 4:
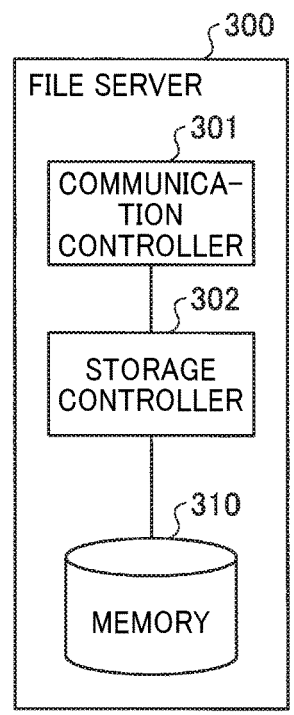
FIG. 4 is a block diagram illustrating a functional configuration of the file server according to the embodiment.

A functional configuration of the file server 300 will be described next. FIG. 4 is a block diagram illustrating the functional configuration of the file server 300 according to the embodiment. As illustrated in FIG. 4, the file server 300 includes a communication controller 301, a storage controller 302, and a memory 310. The communication controller 301 and the storage controller 302 are connected to each other, and the storage controller 302 and the memory 310 are connected to each other.

The memory 310 stores various kinds of information and screens and is implemented by the ROM 602 or the HDD 604 (see FIG. 2). In this embodiment, the memory 310 stores a print-target file of an image, a document, or the like. A print-target file is a file of image data, a document, or the like. In the above-described example including the stores (branch stores) and the head office, the print-target file represents information to be shown to customers, such as an advertisement or notice that is created using an image and text.

The memory 310 stores a print-target file in association with file identification information for identifying the print-target file. Specifically, for example, the memory 310 according to this embodiment stores a print-target file that is assigned a unique file name (an example of file identification information) for identifying the print-target file. Further, the memory 310 collectively stores a plurality of relating print-target files in a folder. Each folder is assigned a unique folder name for identifying the folder.

In addition, in this embodiment, the memory 310 stores a print setting file containing setting information to be set when a corresponding print-target file is printed. Specifically, the memory 310 stores a print setting file that associates with each other a file name identifying a print-target file and setting information to be set when the print-target file is printed. This print setting file is stored in each folder containing one or a plurality of print-target files. In addition, in the case where a folder contains a plurality of print-target files and folders, the print setting file can contain setting information in association with each of the print-target files and folders. A specific example will be given below. Note that the print setting file is an example of an output setting file.

Figure 5:
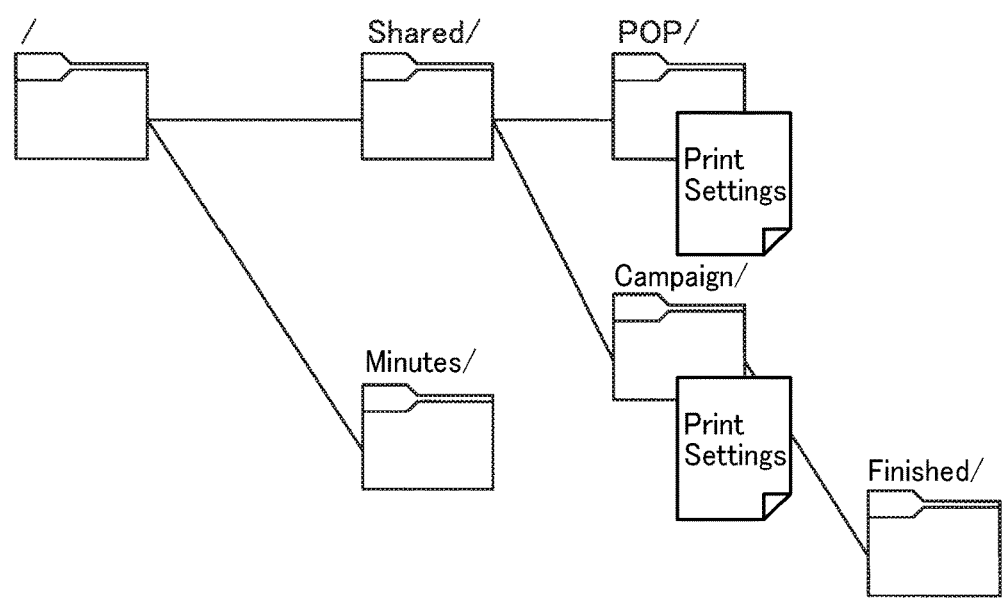
FIG. 5 is an explanatory diagram regarding storage of a print setting file.

FIG. 5 is an explanatory diagram regarding storage of the print-setting file. As described above, the print setting file is stored for each folder. As illustrated in FIG. 5, for example, in the case where a print setting file is created in a folder (target folder) "/Shared/POP/", the path of the print setting file is created such that a specific file name "._print_setting_" is appended to the path of the target folder (i.e., "/Shared/POP/._print_setting_").

In the example illustrated in FIG. 5, a print setting file is stored in a folder "/Shared/POP/" and a folder "/Shared/Campaign/". Setting information contained in each of the print setting file is effective only for the folder storing the print setting file and is not used for the other folders. In addition, since the print setting file has a property of a hidden file, the print setting file is kept invisible to general users when the storage configuration is viewed using a client PC.

FIG. 6 is an illustration of an example of a data structure of a print setting file. As described in FIG. 5, a print setting file stores setting information for print-target file(s) and folder(s) that are stored in a folder storing the print setting file. As illustrated in FIG. 6, the print setting file associates a name of each print-target file or folder with setting information to be set when printing is performed for the print-target file or folder.

In the case where the print setting file illustrated in FIG. 6 is stored in the folder "/Shared/POP/" illustrated in FIG. 5, setting information is associated with a print-target file having a path "/Shared/POP/LeafletA.pdf". Specifically, setting information "color: full color, reduce/enlarge: 100%, number of copies: 100 copies, resolution 600 dpi, tray: auto, 2-sided/1-sided: 1-sided, sort/stack: no" is associated with the print-target file "LeafletA.pdf". Thus, the setting information is set in the MFPs 200 as printing parameters for the print-target file "LeafletA.pdf".

In addition, in FIG. 6, setting information is associated with a folder having a path "/Shared/POP/FolderA". Specifically, setting information "color: monochrome, reduce/enlarge: 100%, number of copies: 100 copies, resolution: 600 dpi, tray: auto, 2-sided/1-sided: 1-sided, sort/stack: no" is associated with the folder "FolderA". Thus, the setting information is set in the MFPs 200 as printing parameters for all print-target files in the folder "FolderA".

Now, a case is described where the print setting file illustrated in FIG. 6 is stored in the folder "FolderA" and the folder "FolderA" stores a plurality of print-target files "LeafletA.pdf", "LeafletB.pdf", and "LeafletC.pdf". In this case, setting information (common setting information) associated with the folder "FolderA" is set for all the print-target files (three print-target files in this example) in the folder "FolderA". In addition, setting information (individual setting information) for each of the print-target files "LeafletA.pdf", "LeafletB.pdf", and "LeafletC.pdf" is set for a corresponding one of the print-target files ("LeafletA.pdf", "LeafletB.pdf", and "LeafletC.pdf") stored in the folder "FolderA". In this case, setting information (individual setting information) for individual files ("LeafletA.pdf", "LeafletB.pdf", and "LeafletC.pdf") is prioritized over the setting information (common setting information) for the folder ("FolderA"), and the individual setting information is set as the printing parameters of the corresponding print-target file. That is, the setting information for the folder ("FolderA") is not used; instead, the setting information for individual files ("LeafletA.pdf", "LeafletB.pdf", and "LeafletC.pdf") is used.

Storage of a print setting file is further described. The following methods for storing a print setting file are conceivable.

A first conceivable method is a method for storing a single print setting file in the root folder to store print settings for all print-target files stored in the file server 300. Note that the root folder is the top-most folder in the file server 300.

A second conceivable method is a method for storing a single print setting file in a setting folder for the printing app 50 to store print settings for all print-target files stored in the file server 300.

A third conceivable method is a method for storing a single print setting file for each print-target file.

A fourth conceivable method is a method for storing a print setting file on a folder-by-folder basis. According to this method, when the user sets print settings, print settings for a plurality of print-target files stored in a folder are collectively written to a single print setting file. This method is employed in this embodiment, and a single print setting file containing print settings for a plurality of print-target files is acquired at a timing at which the corresponding folder stored in the file server 300 is accessed after the launch of the printing app 50, for example. With this configuration, since the print setting file in each folder is acquired only once, a network access can be collectively performed. Consequently, the frequency of communication can be reduced. In addition, since the print setting file need not be acquired repeatedly, the display speed is also increased. In addition, even in the case where the user needs to be authorized for writing in some folders such as the root folder, the print setting file can be stored by using a folder that does not require the user to be authorized for writing.

Although the fourth method, which is more beneficial than the others, is employed in this embodiment, this does not mean exclusion of the first to third methods and any of the first to third methods may be employed.

Note that the print setting file can be stored in the file server 300 from the operation unit 20 of the MFPs 100 and 200 and from the PC 500. In this embodiment, a configuration will be described in which the MFP 100 installed at the head office stores the print setting file and the MFPs 200a and 200b at the branch stores 1 and 2, respectively, acquire the print setting file and prints a corresponding print-target file. The print setting file transmitted from the file server 300 to the MFPs 200 has a data format based on "JavaScript (registered trademark) Object Notation (JSON)"and has an extension".settings", for example.

Referring back to FIG. 4, the communication controller 301 controls communication performed using the communication I/F 606 (see FIG. 2) with external apparatuses, such as the MFPs 100 and 200, connected to the file server 300 via the network 30. For example, the communication controller 301 according to the embodiment receives a request from the MFPs 100 and 200 and transmits information corresponding to the request to the MFPs 100 and 200.

Specifically, for example, in response to receiving, from the MFP 100 or 200, a name of a specified folder that is a folder set by the printing app 50 and a file list acquisition request for acquiring a file list of print-target files (a list of file names), the communication controller 301 refers to the memory 310 and transmits a file list of print-target files stored in the specified folder indicated by the received folder name to the MFP 100 or 200. For example, the data format of the file list transmitted from the file server 300 to the MFP 100 or 200 may be the SMB-specific data format or the JSON format. In addition, the file list is acquired in response to transmission of an acquisition request from the operation unit 20 of the MFP 100 or 200 by using the SMB protocol.

In response to receiving the name of the specified folder and a print setting file acquisition request, the communication controller 301 refers to the memory 310 and transmits, to the MFP 100 or 200, a print setting file stored in the specified folder indicated by the received folder name. That is, the communication controller 301 transmits, to the MFP 100 or 200, a print setting file in a folder storing a print-target file desired to be printed.

In response to receiving a print-target file acquisition request for acquiring a print-target file specified by the user from the MFP 100 or 200, the communication controller 301 refers to the memory 310 and transmits the requested print-target file to the MFP 100 or 200. In the case where a print setting file is created and transmitted by the MFP 100, the communication controller 301 receives the print setting file.

When the file server 300 transmits and receives information to and from the MFP 100 or 200, the file server 300 performs an authentication process on the user who uses the MFP 100 or 200. In this case, the communication controller 301 receives authentication information from the MFP 100 or 200. The file server 300 then performs an authentication process by using the received authentication information. If the authentication is successful, the communication controller 301 transmits the requested information. Note that the authentication information is information with which the user is identifiable and includes, for example, a user ID and a password.

The storage controller 302 stores various kinds of information in the memory 310 and updates and deletes the stored information. In this embodiment, the storage controller 302 stores a print-target file and a print setting file received from an external apparatus in the memory 310 and updates and deletes a print-target file and a print setting file stored in the memory 310, for example.

Figure 7:
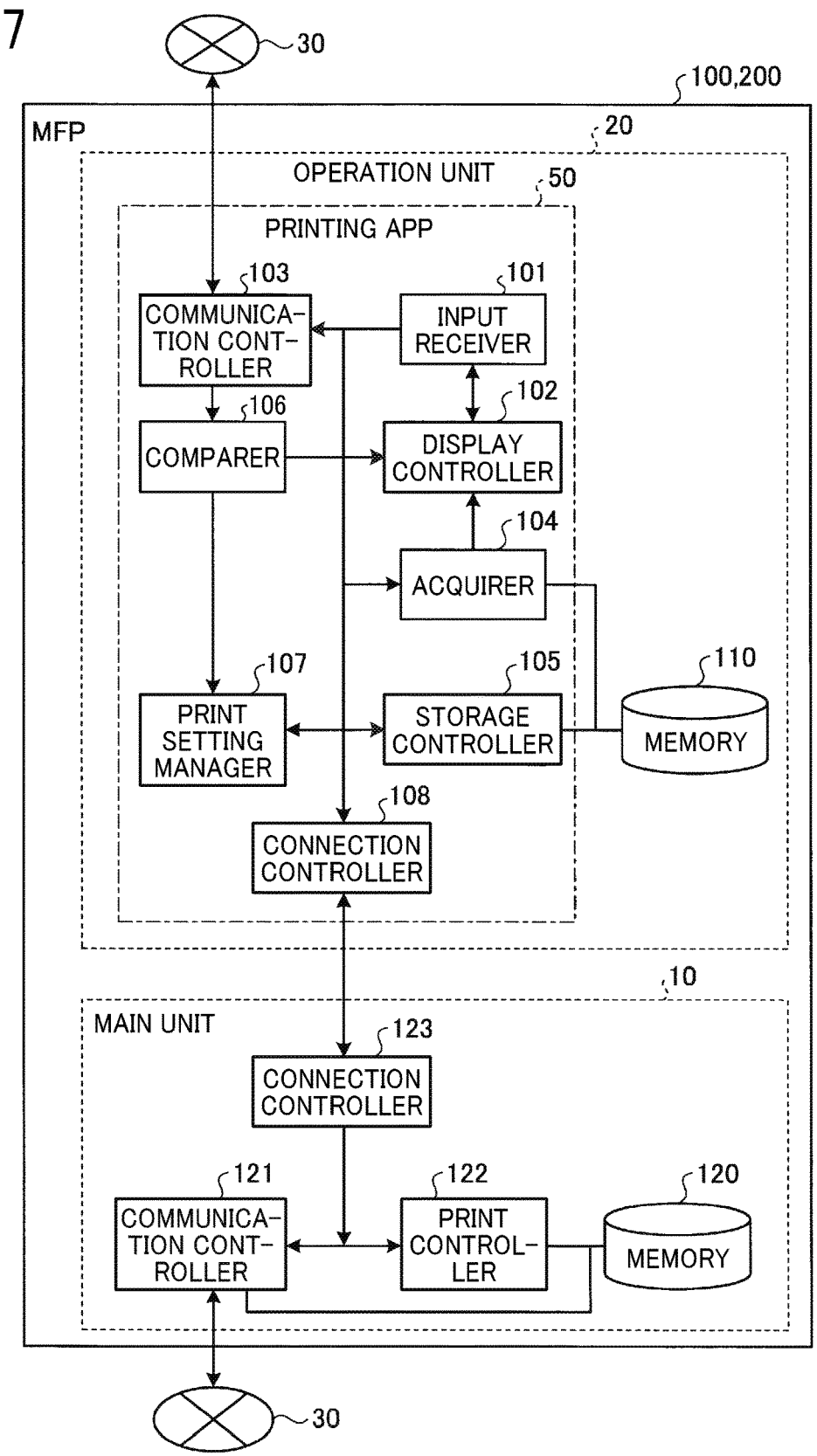
FIG. 7 is a block diagram illustrating a functional configuration of the MFP according to the embodiment.

A functional configuration of the MFP 100 will be described next. Since the MFPs 200 have substantially the same configuration, a description thereof is omitted. FIG. 7 is a block diagram illustrating the functional configuration of the MFPs 100 and 200 according to the embodiment. As illustrated in FIG. 7, the operation unit 20 of the MFP 100 includes an input receiver 101, a display controller 102, a communication controller 103, an acquirer 104, a storage controller 105, a comparer 106, a print setting manager 107, a connection controller 108, and a memory 110, among which relating functional blocks are connected to each other. In addition, the main unit 10 of the MFP 100 includes a communication controller 121, a print controller 122, a connection controller 123, and a memory 120, among which relating functional units are connected to each other. In addition, the operation unit 20 and the main unit 10 are connected to each other via the connection controller 108 and the connection controller 123. The connection controller 108 is implemented by the connection I/F 26 illustrated in FIG. 3, and the connection controller 123 is implemented by the connection IF 16 illustrated in FIG. 3.

Although the MFP 100, that is, a single apparatus, includes the main unit 10 and the operation unit 20 in this embodiment, the main unit 10 and the operation unit 20 may be a plurality of apparatuses. That is, a main device (main unit 10) and an operation device (operation unit 20) may be integrated into a single apparatus as in this embodiment, or the operation device may be a device separate from the main device just like a tablet terminal device.

The memory 110 is included in the operation unit 20. The memory 110 stores various kinds of information and screens and is implemented by the ROM 22 or the flash memory 24 (see FIG. 3). In this embodiment, for example, the memory 110 stores information of various screens, a file list acquired from the file server 300, and a print setting file containing setting information to be set when printing is performed.

The memory 120 is included in the main unit 10. The memory 120 stores various kinds of information and screens and is implemented by the HDD 14 (see FIG. 3). In this embodiment, the memory 120 stores server information that is information regarding the file server 300 and a print-target file acquired from the file server 300.

The server information is information used when the MFP 100 accesses the file server 300. The server information includes, for example, an address (such as Internet Protocol (IP) address) of the file server 300, authentication information (the user ID and the password), and a name of a specified folder. The server information of the file server 300 alone is stored in this embodiment. However, in the case where the MFP 100 is connected to a plurality of file servers, the memory 120 may store server information of all the connected file servers.

Functional blocks of the main unit 10 of the MFP 100 will be described next.

The communication controller 121 transmits and receives, using the communication I/F 15, various kinds of information to and from an external apparatus, such as the file server 300, via the network 30. The connection controller 123 transmits and receives, using the connection I/F 16, various kinds of information to and from the operation unit 20.

The print controller 122 prints, using the engine 17, a print-target file specified by the user in accordance with setting information contained in the corresponding print setting file. The print controller 122 is an example of an output controller.

Functional blocks of the operation unit 20 of the MFP 100 will be described next.

The input receiver 101 performs control to receive various input operations performed by the user via the operation panel 27. Specifically, the input receiver 101 receives an instruction for launching the printing app 50 that performs a print-target file printing process.

Figure 8:
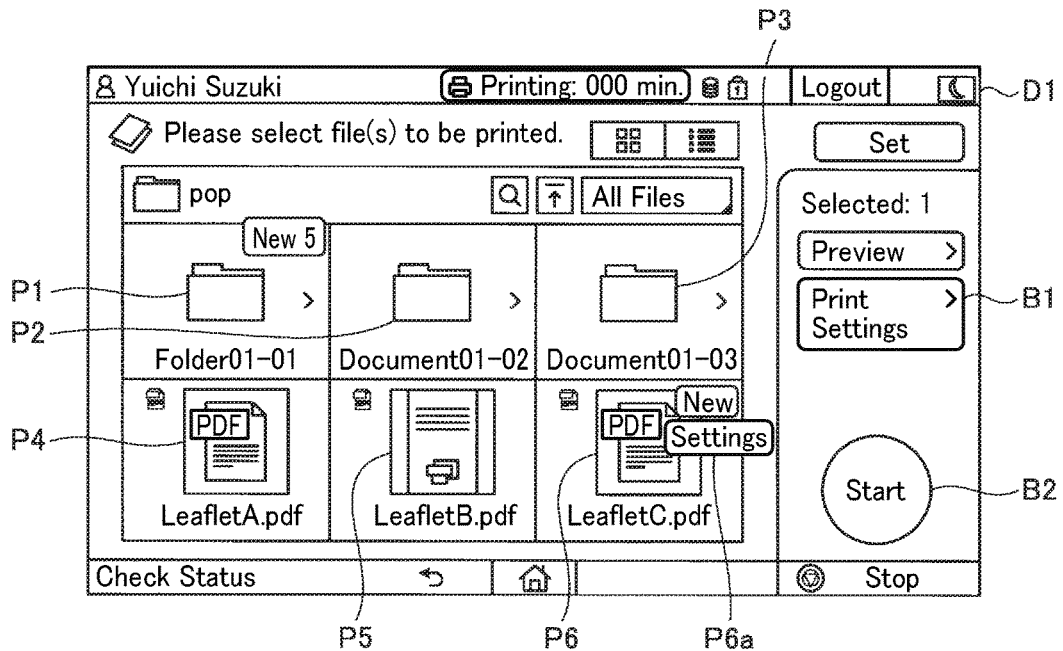
FIG. 8 is an illustration of an example of a file selection screen.

The input receiver 101 also receives selection of a print-target file to be printed and an instruction to start printing the print-target file on a file section screen D1 (see FIG. 8). In this case, the selected print-target file is printed if print settings are successfully set in accordance with the print setting file received from the file server 300.

Figure 9:
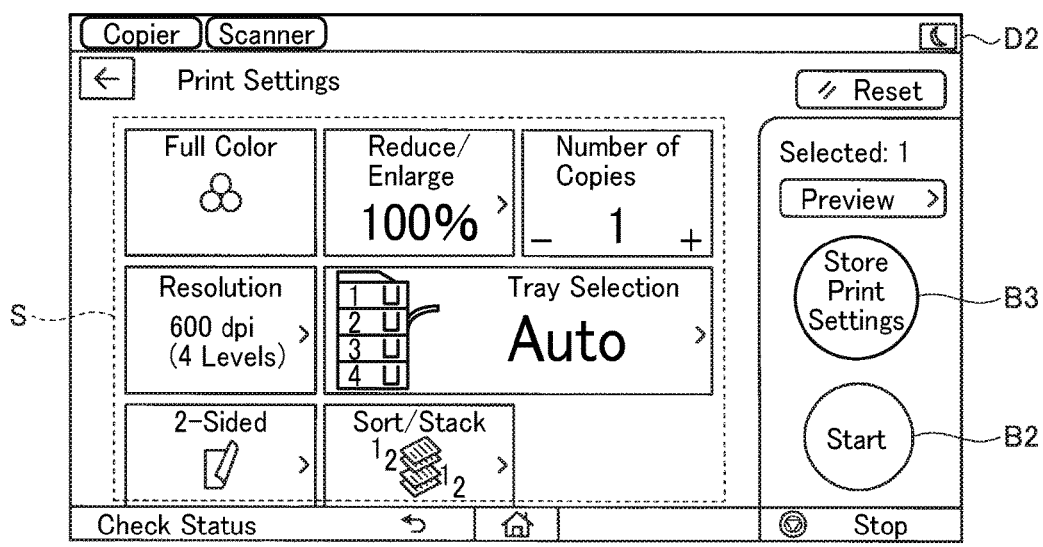
FIG. 9 is an illustration of an example of a print setting screen.

If print settings are not settable in accordance with the print setting file received from the file server 300, the input receiver 101 receives setting information on a print setting screen D2 (see FIG. 9). Then, print settings are set in accordance with the received setting information, and the specified print-target file is printed.

In addition, in the case where a print setting file is generated and stored, the input receiver 101 receives, on the file selection screen D1 (see FIG. 8), selection of a print-target file and a print setting input instruction (output setting input instruction) indicating that setting information for the print-target file is to be input. Then, the print setting screen D2 (see FIG. 9) is displayed, and the input receiver 101 receives, on the print setting screen D2, input setting information and a storage instruction indicating that the setting information is to be stored. Consequently, the input setting information is stored in the file server 300. In this embodiment, the MFP 100 at the head office generates and stores the print setting file.

In the case where a device administrator who is authorized to input setting information of a print setting file and store the print setting file in the file server 300 logs into the MFP 100, the input receiver 101 receives authentication information including a user ID and a password, for example.

The display controller 102 performs control to display various screens, such as a setting screen, and various kinds of information on the operation panel 27. Specifically, based on the file list received by the connection controller 108, the display controller 102 displays on the operation panel 27 (display) a file selection screen that shows a list of icons, which are displayed images of the respective print-target files. At that time, if setting information is present in the print setting file for a print-target file, the display controller 102 attaches a setting badge image (an example of setting presence information) indicating the presence of the setting information to the icon of the print-target file and displays the file selection screen. The display controller 102 also displays, in the file selection screen, a print setting button that is pressed to input a print setting input instruction indicating that the setting information is to be input. In response to pressing of this print setting button, the displayed screen changes to the print setting screen.

Now, the file selection screen is described with reference to FIG. 8. FIG. 8 is an illustration of an example of the file selection screen. In the file selection screen D1 illustrated in FIG. 8, a list of icons P1 to P6 of print-target files is displayed on the left side. A setting badge image P6a ("Settings") indicating that print settings are set, that is, setting information is present, is displayed for the print-target file P6. A menu is displayed on the right side. The menu includes a preview button used to input an instruction for displaying a preview screen, a print setting button B1 used to input a print setting input instruction, and a start button B2 used to input an instruction for starting printing.

The icons (P1 to P6 in FIG. 8) displayed in the file selection screen are created by the printing app 50 on the basis of the file names and the extensions contained in the file list received from the file server 300, for example. Only Joint Photographic Experts Group (JPEG) files are prefetched (the files are acquired in advance when an access is made to the specified folder), and thumbnails are created and displayed. For files other than JPEG files, thumbnails are created when the files are acquired from the file server 300 before outputting, such as printing. For files for which thumbnails are yet to be created (files yet to be acquired), icons indicating the types of the files are displayed. Thus, for example, the icons P4 and P6 illustrated in FIG. 8 are icons indicating the types of the files (that is, the files are yet to be acquired by the MFP 200), and the icon P5 represents a thumbnail (that is, the file has been acquired).

The display controller 102 displays, on the operation panel 27, a print setting screen (output setting screen) on which setting information to be stored in the print setting file is input. At that time, in the case where the user who is authorized to store the print setting file logs in, the display controller 102 displays, in the print setting screen, a print setting storage button B3 that is pressed to input a storage instruction for storing the setting information in the file server 300.

Now, the print setting screen including the print setting storage button is described with reference to FIG. 9. For example, if the user selects one or more print-target files and then presses the print setting button B1 on the file selection screen D1 illustrated in FIG. 8, the print setting screen is displayed. FIG. 9 is an illustration of an example of the print setting screen. In the print setting screen D2 illustrated in FIG. 9, print settings S are displayed on the left side. Specifically, setting information regarding the reduce/enlarge, the number of copies, and the resolution is displayed. In addition, the aforementioned preview button, the print setting storage button B3 used to input an instruction for storing the setting information in the print setting file, and the aforementioned start button B2 are displayed on the right side. If the user changes the print setting S to desired setting information and then presses the print setting storage button B3 on the print setting screen D2, the setting information of the one or more selected print-target files is transmitted to the file server 300 and is stored in the print setting file.

The print setting storage button B3 will also be described. The print setting storage button B3 that is illustrated in FIG. 9 and is used to store the setting information is displayed only when the user logs into the MFP 100 is a device administrator or the like who is authorized to store the setting information. In addition, the print setting storage button B3 is displayed only when the account set for the file server 300 in the printing app 50 is granted a write permission for the target folder.

Although the print setting file is stored by using the MFP 100 or 200 in this embodiment, the print setting file may be stored by using the PC 500. Specifically, when the print setting file is stored using the PC 500, the print setting screen D2 is similarly displayed on the display portion of the display 605 or the like (see FIG. 2) to receive setting information input by the user. In this way, the print setting file can be stored in the file server 300.

In addition, in the case where the print setting file is created and stored by using the MFP 100, a plurality of print-target files can be selected. In this case, the same print settings are set for all the plurality of selected print-target files.

Now, for example, the case is described where the plurality of selected print-target files include a print-target file for which print settings have already been set. In this case, for example, the print setting storage button B3 displayed in the print setting screen D2 is grayed out to make the print setting storage button B3 not operable or not selectable. Alternatively, a warning screen indicating that the plurality of selected print-target files include a print-target file for which print settings have already been set may be displayed in response to pressing of the print setting button B1 of the file selection screen D1 (see FIG. 8).

In addition, if the print setting button B1 is pressed on the file selection screen D1 (see FIG. 8) prior to printing of a print-target file with the setting badge image, the print setting screen D2 is displayed. If the setting information is input, the print setting is changed. If the print-target file is printed without storing the new print settings (without pressing of the print setting storage button B3), the MFP 200 replaces the original print settings with the new print settings and prints the print-target file. If the new print settings are stored (in the case where the print setting storage button B3 is pressed), the setting information (setting information corresponding to the print-target file) contained in the print setting file stored in the file server 300 is replaced. Alternatively, the corresponding setting information contained in the print setting file acquired by the MFP 200 may be updated to the new setting information in the case where the new print settings are stored.

Figure 10:
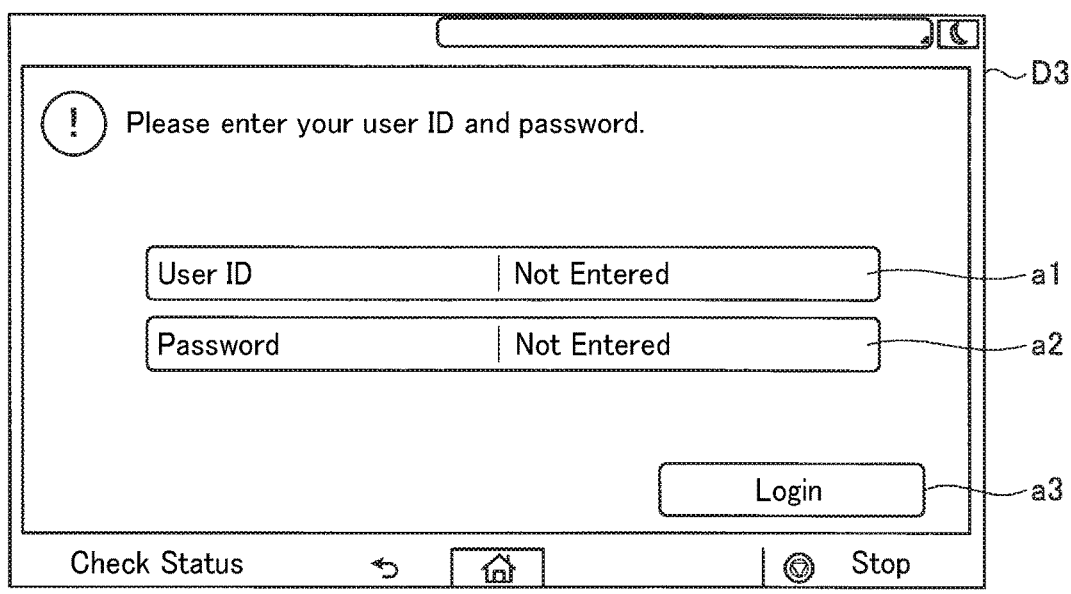
FIG. 10 is an illustration of an example of a login screen.

Further, the display controller 102 displays, on the operation panel 27, a login screen used by the aforementioned device administrator or the like to log into the MFP 100. FIG. 10 is an illustration of an example of the login screen. In a login screen D3 illustrated in FIG. 10, a message prompting the user to input their user ID and password, an input field a1 in which the user ID is input, an input field a2 in which the password is input, and a login button a3 to be pressed to log into the MFP 100 are displayed. The user inputs their user ID and password at the input fields a1 and a2, respectively, and presses the login button a3. In this way, the user can log in as the device administrator.

If the setting information contained in the print setting file acquired from the file server 300 is not settable for the print-target file, the display controller 102 displays a warning screen indicating so on the operation panel 27. The display controller 102 then displays the print setting screen on the operation panel 27 to prompt the user to input setting information.

The communication controller 103 transmits and receives, using the communication I/F 25, various kinds of information to and from a mobile terminal such as a smartphone or a tablet, for example.

The connection controller 108 transmits and receives, using the connection I/F 26, various information and screens to and from the main unit 10. Thus, the connection controller 108 receives, using the connection I/F 26, via the connection controller 123 of the main unit 10, various kinds of information that is received by the communication controller 121 of the main unit 10 from an external apparatus such as the file server 300. The connection controller 108 also transmits, using the connection/F 26, via the connection controller 123 of the main unit 10, various kinds of information to an external apparatus such as the file server 300.

Specifically, the connection controller 108 transmits and receives the following information to and from the file server 300 via the connection controller 123 and the communication controller 121. The connection controller 108 transmits a file list acquisition request to the file server 300 together with the server information and the folder name of the specified folder, and receives a file list of files contained in the specified folder indicated by the folder name. That is, the connection controller 108 receives a file list containing file names of print-target files contained in the specified folder. The connection controller 108 also transmits a print setting file acquisition request to the file server 300 together with the folder name of the specified folder and receives the print setting file in the specified folder indicated by the folder name. That is, the connection controller 108 receives a print setting file that is contained in the specified folder and that is associated with print-target files contained in the specified folder.

After receiving the file list and the print setting file, the connection controller 108 transmits a print-target file acquisition request for acquiring a print-target file represented by an icon selected by the user on the file section screen D1 to the file server 300 and receives the print-target file represented by the selected icon. The connection controller 108 receives the print-target file when the print-target file is printed by the print controller 122 (when an instruction for starting printing the print-target file is received). When a storage instruction is received, the connection controller 108 transmits the file name of the print-target file selected by the user and the setting information input by the user to the file server 300. The connection controller 108 is an example of a communication controller.

The acquirer 104 acquires desired information from the memories 110 and 120. Specifically, for example, when the file selection screen D1 is displayed, the acquirer 104 acquires the file list and the print setting file from the memory 110.

The storage controller 105 performs control to store information in the memories 110 and 120. Specifically, the storage controller 105 stores the file list and the print setting file received from the file server 300 in the memory 110. The storage controller 105 also stores a print-target file received from the file server 300 in association with the file name of the print-target file.

The comparer 106 compares the file names contained in the print setting file received from the file server 300 with the file names contained in the received file list. If the print setting file contains a file name that matches one of the file names contained in the file list, the display controller 102 displays the setting badge image indicating that the setting information is present for the print-target file indicated by the file name displayed on the file selection screen D1.

When a print-target file received from the file server 300 (print-target file selected by the user) is printed, the print setting manager 107 refers to the received print setting file and sets print settings in accordance with setting information associated with the file name of the print-target file. As described in FIG. 6, if a print setting file stored in a folder contains common setting information for the folder and individual setting information for individual print-target files stored in the folder, the print setting manager 107 prioritizes the individual setting information over the common setting information and sets print settings in accordance with the individual setting information. In addition, when print settings are not settable in accordance with the setting information of the received print setting file, the print setting screen is displayed to receive the setting information input by the user. In this case, the print setting manager 107 sets print settings in accordance with the setting information input by the user. The print setting manager 107 is an example of an output setting manager.

As described above, the printing app 50 of the operation unit 20 according to the embodiment receives, from the file server 300 by using the SMB protocol, a print setting file and a file list containing file names of print-target files. The printing app 50 displays a file selection screen (a list of icons (displayed images) of the print-target files) on the basis of extensions of the print-target files contained in the received file list. The printing app 50 then compares each file name contained in the print setting file with file names contained in the file list, and attaches the setting badge image indicating the presence of the setting information to an icon of each print-target file indicated by the file name associated with the setting information. In response to a printing start instruction for the print-target file represented by the icon with the setting badge image, the printing app 50 receives the print-target file from the file server 300. The printing app 50 also sends a print instruction to the printing function of the main unit 10 by using the setting information associated with the file name of the print-target file with reference to the received print setting file. Note that functional blocks within a dot-dash line illustrated in FIG. 7 represent functions of the printing app 50.

The overview of a flow of a process in which the MFP 200 acquires, from the file server 300, a print-target file selected from the file list and prints the print-target file will be described next. In response to launching of the printing app 50, the operation unit 20 of the MFP 200 acquires the file list and the print setting file from the file server 300 by using the SMB protocol.

The operation unit 20 creates icons of print-target files on the basis of extensions in the file names contained in the file list. The operation unit 20 also compares the file list with the print setting file. Specifically, the operation unit 20 extracts the entire file name that follows the last "¥" in the file identification information (see the column NAME in FIG. 14) contained in the file list and that matches one of the file names (see the column FILE NAME in FIG. 6) contained in the print setting file.

The operation unit 20 attaches the setting badge image to icons corresponding to the respective file names (print-target files for which the setting information is present) extracted from the file list and displays a list of icons (see the file selection screen D1 illustrated in FIG. 8). Note that the print-target files have not been acquired by the MFP 200 yet at this point. That is, the MFP 200 has not acquired print-target files except for print-target files printed in the past and JPEG files.

The operation unit 20 acquires, from the file server 300, a print-target file selected for printing by the user from among the print-target files represented by the displayed list of icons. If the selected print-target file is a print-target file with the setting badge image, the operation unit 20 sets the setting information contained in the print setting file acquired by the MFP 200 as print settings and prints the print-target file.

In the case where the print settings are changed but the print-target file is printed without storing the new print settings, the new print settings are used for printing of the print-target file performed only this time. On the other hand, in the case where the print settings are changed and the new settings are stored before the print-target file is printed, the setting information contained in the print setting file stored in the file server 300 or acquired by the operation unit 20 of the MFP 200 is updated, that is, is rewritten. Details of a file-selection-screen display process and a print-target file printing process will be described below.

Figure 11:
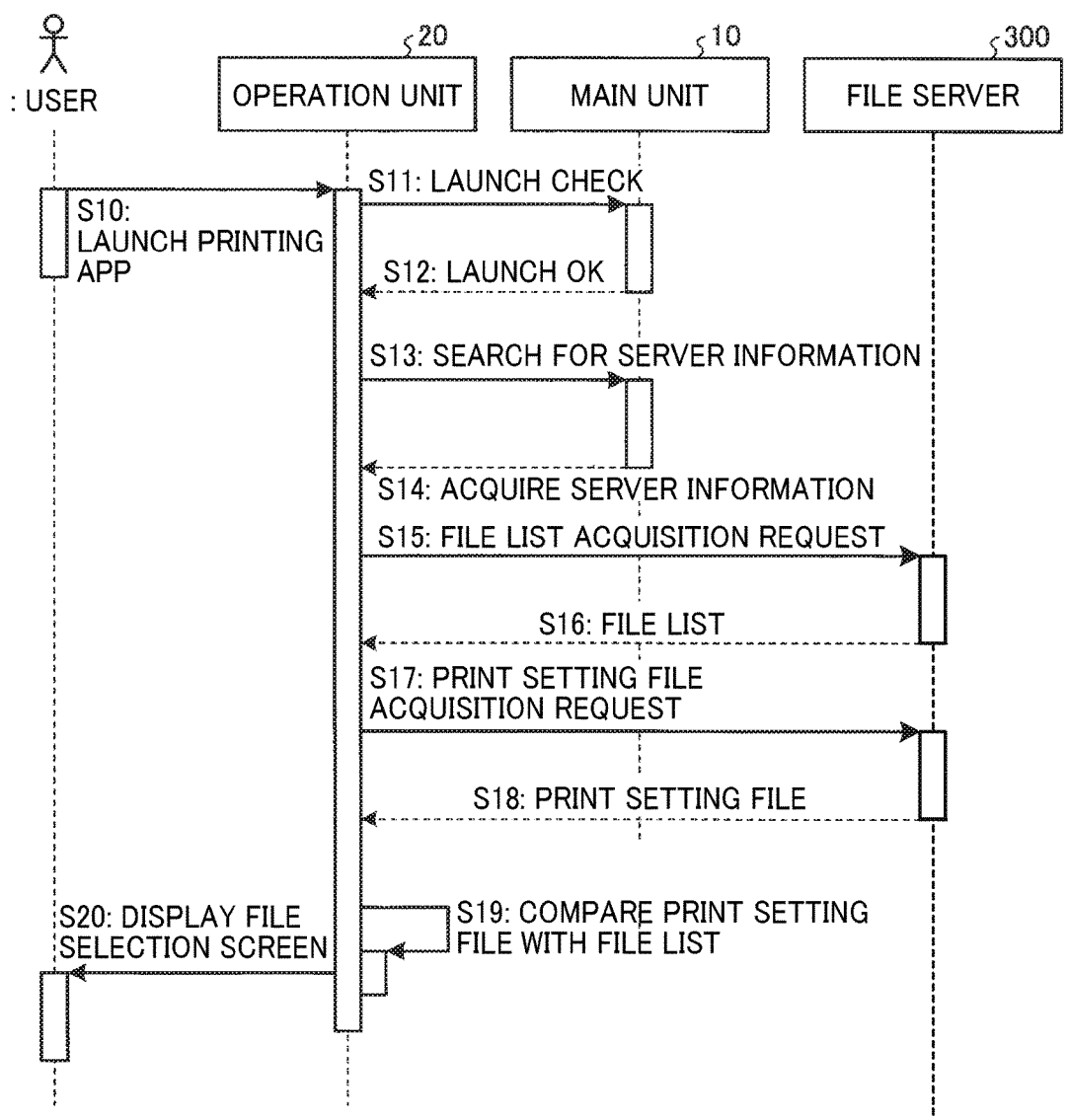
FIG. 11 is a sequence diagram illustrating a file-selection-screen display process performed by the MFP according to the embodiment.

A process in which the MFP 200 acquires the file list and the print setting file from the file server 300 and displays the file selection screen D1 (see FIG. 8) will be described next. FIG. 11 is a sequence diagram illustrating a file-selection-screen display process performed by the MFP 200 according to the embodiment.

In response to receiving an instruction for launching the printing app 50 from the user (step S10), the operation unit 20 sends a launch check inquiry to the main unit 10 (step S11). If the printing app 50 is successfully launched, the operation unit 20 acquires a notification indicating so (launch OK) (step S12). The launch check inquiry that is sent from the operation unit 20 to the main unit 10 includes a launch check/connection check inquiry that is sent from the operation unit 20 to the web server of the main unit 10 (service layer of the main unit 10) to check whether the operation unit 20 and the main unit 10 are connected and powered to be ready for use.

Then, the operation unit 20 searches the memory 120 of the main unit 10 for server information (step S13) and acquires stored server information of the file server 300 (step S14).

The operation unit 20 accesses the file server 300 in accordance with the address contained in the acquired server information and transmits a file list acquisition request to the file server 300 together with authentication information and a folder name of a specified folder (step S15).

The authentication information, the file name of the specified folder, and the file list acquisition request that are transmitted from the MFP 200 to the file server 300 will be described specifically with reference to FIG. 12. FIG. 12 is an explanatory diagram of the authentication information, the name of the specified folder, and the file list acquisition request that are transmitted from the MFP 200 to the file server 300. As illustrated in FIG. 12, items of the information that is transmitted to the file server 300 include a command, a folder name of a specified folder, and a user ID and a password that are authentication information. FIG. 12 illustrates specific content of these items. That is, the MFP 100 transmits, to the file server 300, the command "ACQUISITION OF FILE LIST", the folder name of the specific folder "¥¥192.168.0.1¥SharedFiles¥POPFiles" (full path), the user ID (authentication information) "user B", and the password (authentication information) "password".

Referring back to FIG. 11, the operation unit 20 receives the file list of print-target files stored in the specified folder (step S16).

Now, the file list received by the MFP 200 from the file server 300 (as a response to the information illustrated in FIG. 12) will be specifically described with reference to FIGS. 13 and 14. FIG. 13 is an explanatory diagram of the file list received by the MFP 200 from the file server 300. As illustrated in FIG. 13, items of information received from the file server 300 include a type, a name, access permission information, an owner, a creation date/time, and a size. FIG. 13 illustrates specific content of these items.

Specifically, the item "TYPE" is of a flag data type and indicates one of a folder and a print-target file. In addition, the item "NAME" is of a character data type and indicates a file name of a print-target file or a folder name of a folder storing a print-target file. In FIG. 13, the item "NAME" indicates an example of the name of an object whose type is a print-target file, that is, a print-target file name "¥¥192.168.0.1¥SharedFilesYPOPFiles¥LeafletA.pdf".

Further, the item "ACCESS PERMISSION INFORMA-

TION" is of a flag data type and indicates one of read and write, read, and access prohibited. The item "OWNER" is of a character data type and indicates a person who created the print-target file. In FIG. 13, the item "OWNER" indicates "userB". In addition, the item "CREATION DATE/TIME" is of an integer data type and indicates "2016/02/25/13:00:05" in FIG. 13. The item "SIZE" is of an integer data type and indicates the size of the print-target file, that is, 1048576 bytes in FIG. 13.

In addition, a folder stored in the file server 300 sometimes contains a plurality of folders and print-target files, for example. Thus, the case where a plurality of sets of pieces of information of the items illustrated in FIG. 13 are transmitted as a response from the file server 300 will be described with reference to FIG. 14. FIG. 14 is an explanatory diagram of a file list transmitted by the file server 300 to the MFP.

In the case where a folder stored in the file server 300 contains a plurality of folders and print-target files, a plurality of pieces of information are returned for each of the items (the type, the name, the access permission information, the owner, the creation date/time, and the size) as illustrated in FIG. 14. FIG. 14 illustrates an example in which a specified folder contains three print-target files and a folder.

Referring back to FIG. 11, the operation unit 20 transmits a print setting file acquisition request to the file server 300 together with the folder name of the specified folder (step S17). Specifically, for example, by using the SMB protocol, the operation unit 20 specifies a print setting file by using the specified folder name to request the file server 300 serving as an access destination to provide the print setting file and to acquire the print setting file from the file server 300. The operation unit 20 then receives the print setting file stored in the specified folder (step S18).

Then, the operation unit 20 compares the print setting file with the file list received from the file server 300 (step S19). Specifically, the operation unit 20 determines whether each of the file names contained in the print setting file matches any of the file names contained in the file list. If the file names match, print settings are set for the print-target file represented by that file name, that is, the setting information is present.

The display controller 102 then attaches the setting badge image to the icon of the print-target file for which the setting information is present and displays the file selection screen D including a list of print-target files (step S20).

Figure 15A:
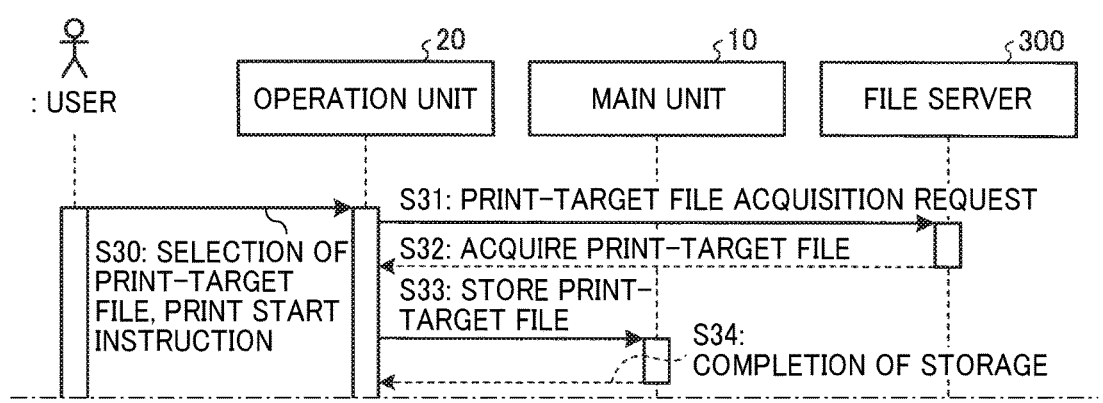
FIGS. 15A and 15B (FIG. 15) are a sequence diagram illustrating a print-target file printing process performed by the MFP according to the embodiment.
Figure 15B:
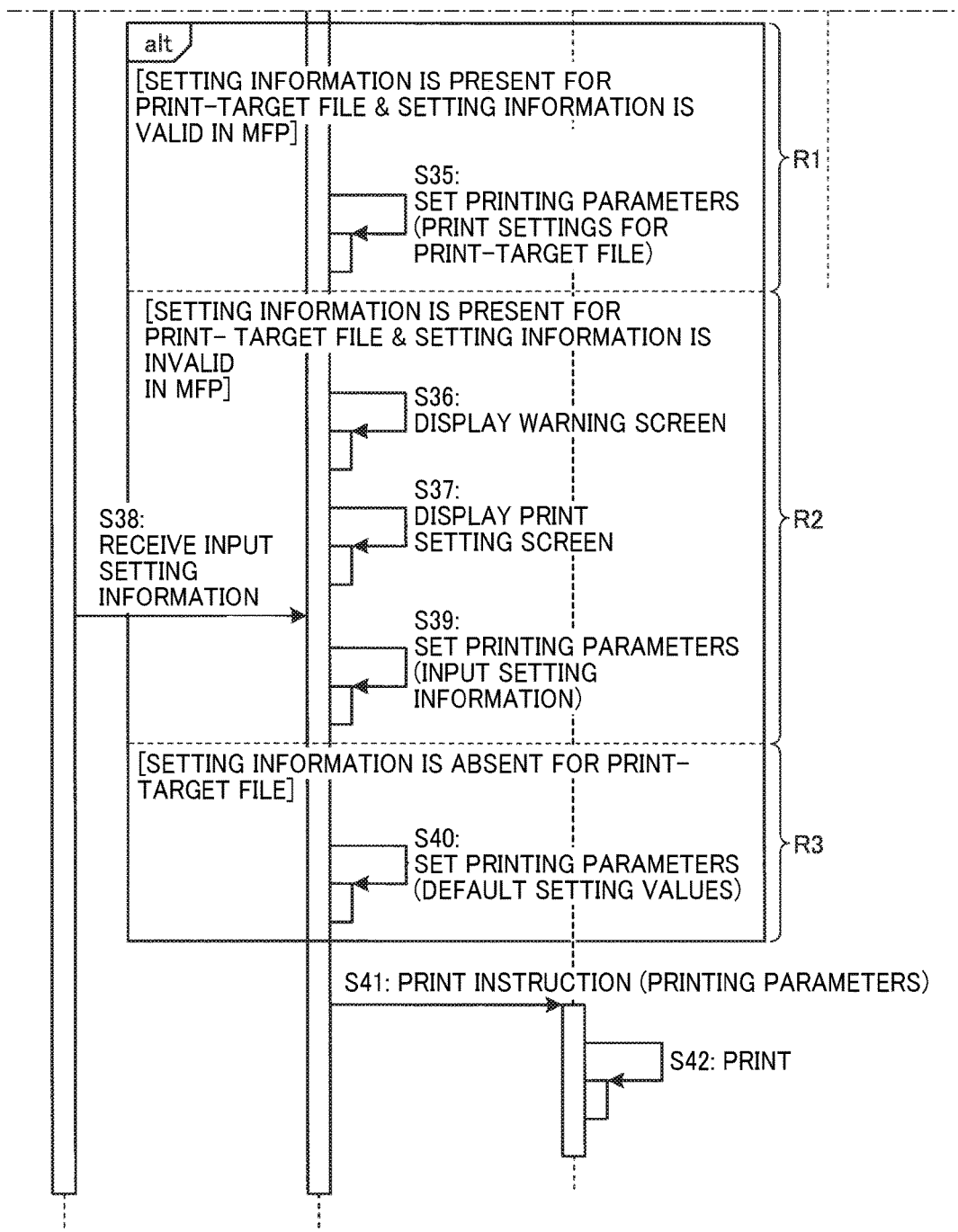

A process in which the MFP 200 acquires a print-target file from the file server 300 and prints the print-target file will be described next. FIG. 15 is a sequence diagram illustrating a print-target file printing process performed by the MFP 200 according to the embodiment.

In response to receiving, from the user, selection of a print-target file and a printing start instruction (output start instruction) on the file selection screen D1 (step S30), the operation unit 20 transmits a print-target file acquisition request for acquiring the selected print-target file to the file server 300 (step S31) and acquires the print-target file (step S32).

The operation unit 20 stores the acquired print-target file in the memory 120 of the main unit 10 (step S33) and acquires a notification indicating completion of storage from the main unit 10 (step S34).

After storage of the print-target file is completed, the operation unit 20 sets printing parameters. At that time, in accordance with the print setting file acquired when the file list is acquired, the process branches depending on whether setting information is present for the print-target file and further branches, if the setting information is present, depending on whether the setting information is valid in the MFP 200 used for printing. The case where the setting information is invalid refers to a case where the plurality of setting items include at least one item for which the print setting is not settable because of the presence/absence of the finisher or a difference in the tray settings.

If the setting information is present for the print-target file and is valid in the MFP 200, the operation unit 20 performs processing R1 illustrated in FIG. 15. Specifically, the operation unit 20 sets the setting information contained in the print setting file as printing parameters of the print settings for the print-target file (step S35).

If the setting information is present for the print-target file and is invalid in the MFP 200, the operation unit 20 performs processing R2 illustrated in FIG. 15. Specifically, the operation unit 20 displays a warning screen indicating that the setting information contained in the print setting file is not settable for the print-target file to inform the user of the situation (step S36). Then, the operation unit 20 displays the print setting screen D2 (see FIG. 9) (step S37) to prompt the user to input the setting information. In response to receiving the setting information input by the user (step S38), the operation unit 20 sets the input setting information as the printing parameters of the print settings (step S39).

If the setting information is absent for the print-target file, the operation unit 20 performs processing R3 illustrated in FIG. 15. Specifically, the operation unit 20 sets default setting values that are set in the MFP 200 in advance as the printing parameters of the print settings (step S40).

After performing the processing R1, R2, or R3, the operation unit 20 transmits a print instruction (output instruction) to the main unit 10 together with the set printing parameters (step S41). The main unit 10 asynchronously prints the print-target file on the basis of the printing parameters (step S42).

The case where a plurality of print-target files are selected and printed will be described. If the same setting information is present for all the plurality of print-target files, the same setting information is set for all the print-target files and the print-target files are printed as in the processing R1. If different pieces of setting information are present for the plurality of print-target files, for example, a warning screen indicating that the setting information is not settable because the different pieces of setting information are present for the print-target files is displayed, default setting values are set for all the print-target files, and the print-target files are printed as in the processing R3. Alternatively, for example, after the warning screen is displayed, the print setting screen is displayed, setting information input by the user is received, the input setting information is set, and the print-target files are printed as in the processing R2.

Figure 16:
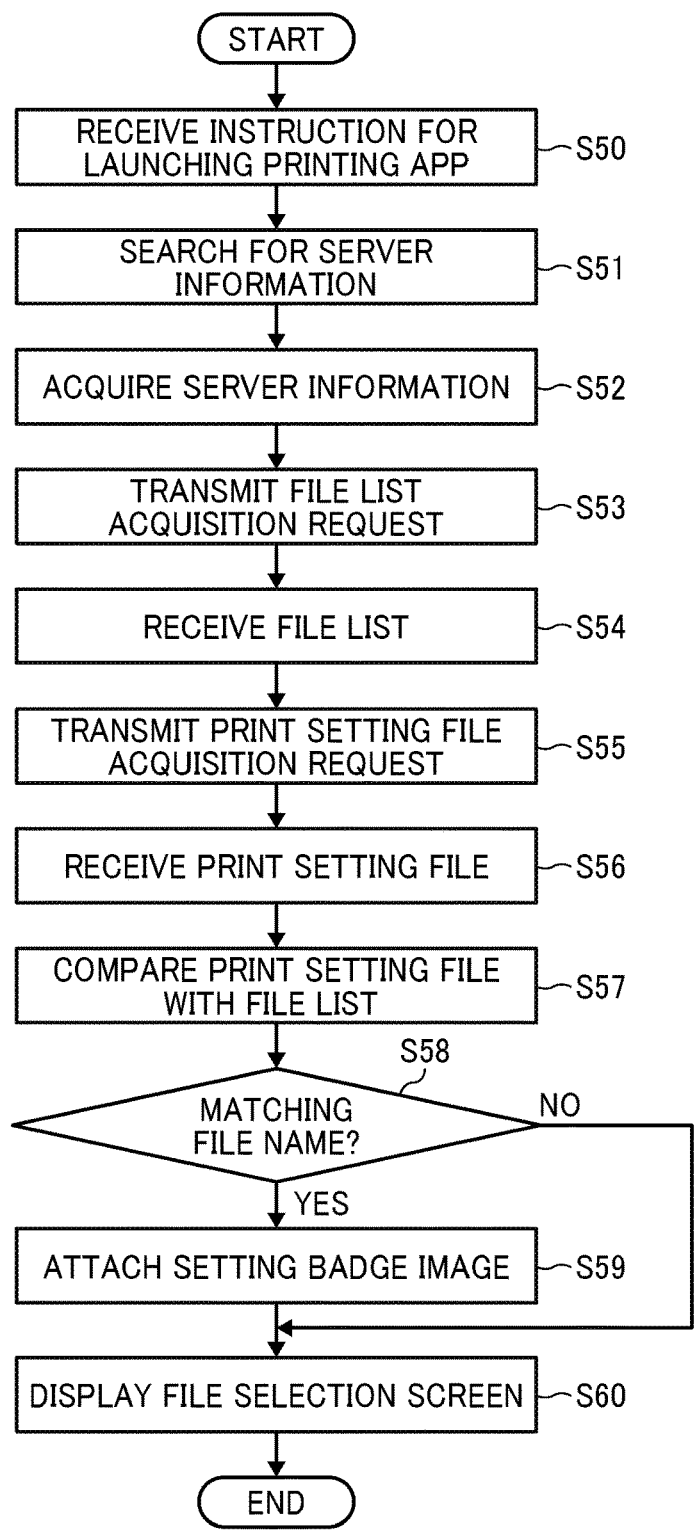
FIG. 16 is a flowchart illustrating the file-selection-screen display process performed by the MFP according to the embodiment.

A process in which the MFP 200 acquires the file list and the print setting file from the file server 300 and displays the file selection screen D1 (see FIG. 8) will be described next. FIG. 16 is a flowchart illustrating the flow of the file-selection-screen display process performed by the MFP 200 according to the embodiment.

In response to receiving an instruction to launch the printing app 50 from the user (step S50), the input receiver 101 checks whether the printing app 50 is successfully launched. If the printing app 50 is successfully launched, the acquirer 104 searches the memory 120 of the main unit 10 for server information (step S51) and acquires the stored server information regarding the file server 300 (step S52).

Then, the connection controller 108 transmits, via the connection controller 123 and the communication controller 121, a file list acquisition request (see FIG. 12) to the file server 300 together with authentication information and the folder name of the specified folder that are contained in the server information (step S53). The connection controller 108 then receives, via the connection controller 123 and the communication controller 121, a file list (see FIG. 14) of print-target files stored in the specified folder from the file server 300 (step S54).

Further, the connection controller 108 transmits, via the connection controller 123 and the communication controller 121, a print setting file acquisition request to the file server 300 together with the folder name of the specified folder (step S55). Then, the connection controller 108 receives, via the connection controller 123 and the communication controller 121, the print setting file stored in the specified folder from the file server 300 (step S56).

Then, the comparer 106 compares the received print setting file with the file list received from the file server 300 (step S57) and determines whether each file name contained in the print setting file matches any of file names contained in the file list (step S58).

If the file names match (YES in step S58), the setting badge image is attached because setting information is present for the print-target file indicated by the file name (step S59). Then, the display controller 102 attaches the setting badge image to each print-target file for which the setting information is present and displays the file selection screen D1 on the operation panel 27 (step S60).

If the file names do not match (NO in step S58), the display controller 102 displays, on the operation panel 27, the file selection screen D1 without attaching the setting badge image to the print-target files.

Figure 17:
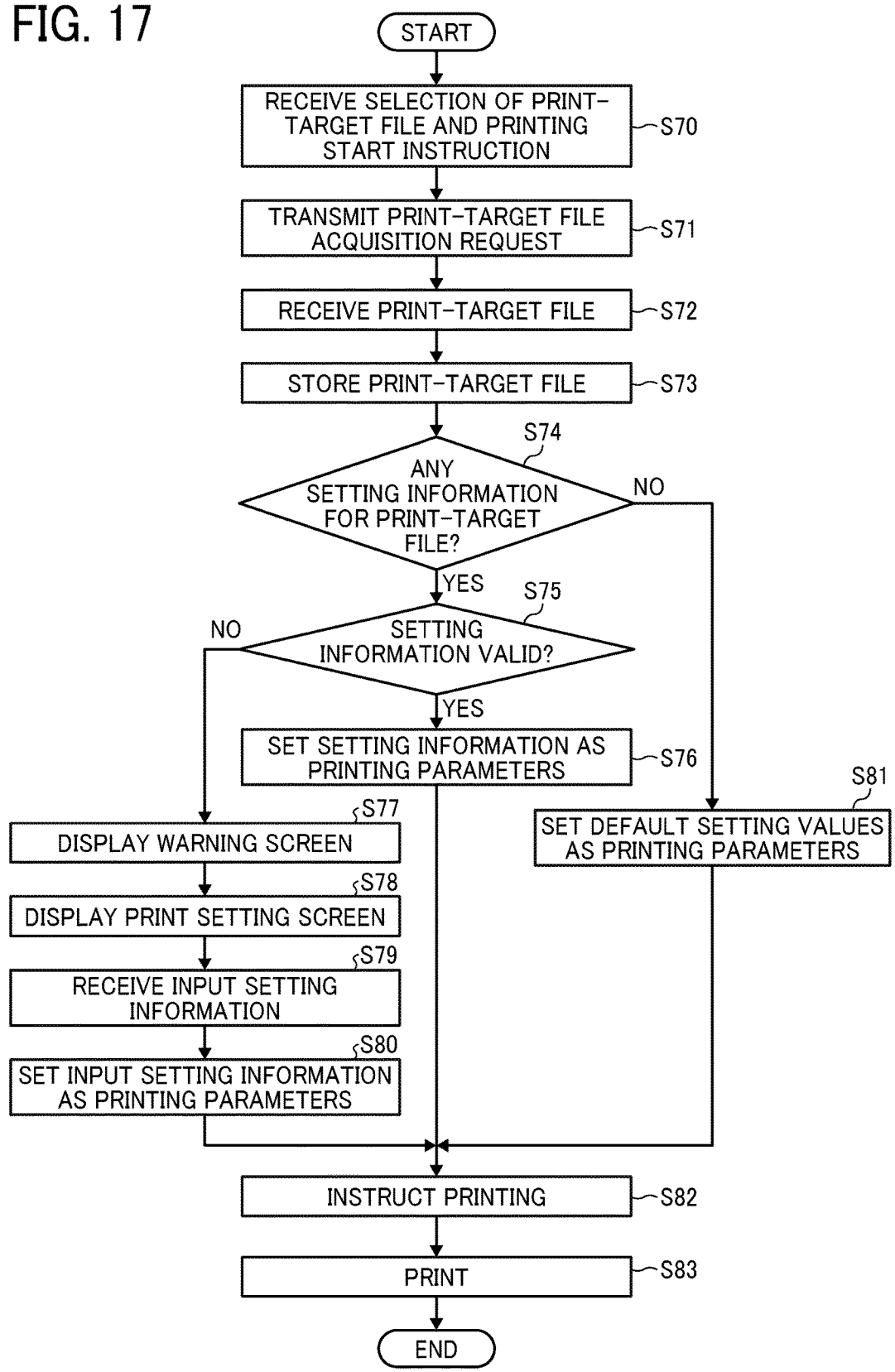
FIG. 17 is a flowchart illustrating the print-target file printing process performed by the MFP according to the embodiment.

A process in which the MFP 200 acquires a print-target file from the file server 300 and prints the print-target file will be described next. FIG. 17 is a flowchart illustrating the flow of the print-target file printing process performed by the MFP 200 according to the embodiment.

First, the input receiver 101 receives selection of a print-target file and a printing start instruction from the user on the file selection screen D1 (step S70). The connection controller 108 transmits, via the connection controller 123 and the communication controller 121, a print-target file acquisition request for acquiring the selected print-target file to the file server 300 (step S71) and acquires the print-target file (step S72). The storage controller 105 then stores the print-target file in the memory 120 (step S73).

The print setting manager 107 determines whether setting information is present for the selected print-target file (step S74). If the setting information is present (YES in step S74), the print setting manager 107 determines whether the setting information is valid in the MFP 200 (step S75).

If the setting information is valid (YES in step S75), the print setting manager 107 sets the setting information contained in the print setting file as printing parameters of the print settings for the selected print-target file (step S76).

If the setting information is invalid (NO in step S75), the display controller 102 displays a warning screen indicating that the setting information contained in the print setting file is not settable for the selected print-target file (step S77). The display controller 102 then displays the print setting screen D2 (see FIG. 9) (step S78) to prompt the user to input the setting information. In response to the input receiver 101 receiving the setting information input by the user (step S79), the print setting manager 107 sets the input setting information as the printing parameters of the print settings (step S80).

If the setting information is absent in step S74 (NO in step S74), the print setting manager 107 sets default setting values that are set in the MFP 200 in advance, as the printing parameters of the print settings (step S81).

Then, the print setting manager 107 transmits, via the connection controllers 108 and 123, a print instruction to the print controller 122 together with the set printing parameters (step S82). The print controller 122 asynchronously prints the print-target file on the basis of the printing parameters (step S83).

A process in which the MFP 200 receives input setting information for a selected print-target file and stores the setting information in the print setting file will be described next. FIG. 18 is a flowchart illustrating the flow of a print-setting-file storage process performed by the MFP 200 according to the embodiment.

First, the input receiver 101 receives selection of a print-target file for which the setting information is desired to be stored from the user on the file selection screen D1 (see FIG. 8) (step S170). The input receiver 101 then receives a print setting input instruction in response to pressing of the print setting button B1 (step S171).

In response to pressing of the print setting button B1, the display controller 102 displays the print setting screen D2 (see FIG. 9) on the operation panel 27 (step S172). The input receiver 101 receives setting information input on the print setting screen D2 (step S173). Then, the input receiver 101 receives a setting information storage instruction in response to pressing of the print setting storage button B3 (step S174).

In response to pressing of the print setting storage button B3, the connection controller 108 transmits, via the connection controller 123 and the communication controller 121, the file name of the selected print-target file and the input setting information to the file server 300 (step S175). The file server 300 that has received the file name of the selected print-target file and the setting information stores the file name and the setting information in association with each other in the print setting file stored in the folder that contains the print-target file in the memory 310.

As described above, in the image processing system according to the embodiment, the file server 300 stores a print-target file and a print setting file (file that associates the file name of the print-target file with setting information to be set when the file is printed) that are generated using the MFP 100 or the PC 500, in a folder storing the print-target file. The MFP 200 receives the print-target file and the print setting file from the file server 300, sets the setting information contained in the print setting file, and prints the print-target file. With this configuration, desired print settings can be set for a print-target file and the print-target file can be printed, without setting the print settings individually in the MFP 200 when the print-target file is acquired from the file server 300 and is printed.

Note that the programs executed by the MFPs 100 and 200 according to the embodiment are provided after being preinstalled in the ROM or the like. The programs executed by the MFPs 100 and 200 according to the embodiment may be provided after being stored as an installable or executable file on a computer-readable recording medium, such as a Compact Disc-Read Only Memory (CD-ROM), a flexible disk (FD), a CD-Recordable (CD-R), or a Digital Versatile Disk (DVD).

Further, the programs executed by the MFPs 100 and 200 according to the embodiment may be stored in a computer that is connected to a network such as the Internet, downloaded via the network, and provided. In addition, the programs executed by the MFPs 100 and 200 according to the embodiment may be provided or distributed via a network such as the Internet.

The programs executed by the MFPs 100 and 200 according to the embodiment are configured as modules including the above-described components (the input receiver, the display controller, the communication controller, the acquirer, the storage controller, the comparer, and the print setting manager). In the implementation, hardware such as a CPU (processor) reads the programs from the ROM and executes the programs, whereby the components are loaded to the main memory and generated in the main memory. Alternatively, some or all of the functions of the above-described components may be implemented by a dedicated hardware circuit.

In the embodiment, the description has been given of the example in which the image processing apparatus according to an embodiment of the present invention is applied to an MFP having at least two functions of a copier function, a printer function, a scanner function, and a fax function. However, the image processing apparatus according to the embodiment is applicable to any given apparatus that includes an image former such as a copier, a printer, or a fax.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image processing apparatus connected to an external apparatus via a network, comprising:
a network interface to receive an output-target file and an output setting file from the external apparatus, the output setting file associating file identification information for identifying the output-target file with setting information to be set when the output-target file is output; and
circuitry to set an output setting in accordance with the setting information associated with the file identification information of the output-target file, and to output the output-target file in accordance with the output setting that is set,
wherein the network interface receives, from the external apparatus, a file list containing file identification information identifying each of a plurality of output-target files stored in a folder at the external apparatus, and an output setting file stored in the folder and containing file identification information identifying the output-target file to be set with setting information indicated by the output setting file, and
wherein the circuitry
compares the file identification information contained in the output setting files with the file identification information contained in the file list, and
when the file identification information contained in the output setting file matches any one of the file identification information contained in the file list,
for each one or more items of file identification information that match, attaches setting presence information indicating a presence of the setting information to an image of the output-target file indicated by the file identification information that matches, and displays, on the display, the image of the output-target file that is attached with the setting presence information.

2. The image processing apparatus according to claim 1, wherein the external apparatus stores a plurality of output-target files in a folder,
wherein the setting information in the output setting file includes common setting information that is common to all of the output-target files stored in the folder in the external apparatus and individual setting information that is specific to an individual output-target file, and
wherein the circuitry prioritizes the individual setting information over the common setting information and sets the output setting using the individual setting information specific to the output-target file.

3. The image processing apparatus according to claim 1, wherein the network interface further receives, from the external apparatus, a file list containing file identification information identifying each of a plurality of output-target files stored in a folder at the external apparatus, and at least one output setting file indicating a setting of the plurality of output-target files,
wherein the circuitry displays, on a display, a plurality of images respectively corresponding to the plurality of output-target files in accordance with the received file list, and
wherein the output-target file to be output corresponds to one of the plurality of images selected by a user from the plurality of images being displayed.

4. The image processing apparatus according to claim 3, wherein the network interface receives, from the external apparatus, the output-target file corresponding to the image selected by the user when an instruction for outputting the output-target file is received.

5. The image processing apparatus according to claim 3, wherein the circuitry includes:
first circuitry, provided at a main unit, which operates under control of a first operating system; and
second circuitry, provided at an operation unit, which operates under control of a second operating system, the second circuitry being configured to instruct the main unit to perform output processing according to an output application that runs on the second operating system,
wherein the network interface is provided at the operation unit and receives the file list and the output setting files, using Server Message Block protocol,
wherein the second circuitry displays the images of the output-target files in accordance with file extensions of the output-target files,
wherein, in response to receiving, from the external apparatus, an output start instruction for outputting one of the plurality of output-target files corresponding to one of the plurality of images selected by the user from the plurality of images being displayed,
the second circuitry instructs the first circuitry to output the selected output-target file in accordance with the setting information indicated by the output setting file corresponding to the selected output-target file.

6. The image processing apparatus according to claim 3, further comprising:
a user interface to receive selection of one of the plurality of images being displayed, as selection of the output-target file to be output,
wherein the network interface sends a request for acquiring the selected output-target file to the external apparatus, and receives the selected output-target file as a response to the request for acquiring the selected output-target file.

7. The image processing apparatus according to claim 6, wherein the circuitry further determines whether the output setting indicated by the setting information contained in the output setting file of the selected output-target file is settable, and
based on a determination indicating that the output setting is not settable, the circuitry further displays, on the display, an output setting screen on which setting information is to be input, and sets the output setting in accordance with the setting information input on the output setting screen.

8. The image processing apparatus according to claim 7, wherein the user interface further receives an output setting input instruction indicating that the setting information is to be input for the selected output-target file,
wherein the circuitry displays, on the display, the output setting screen in response to the output setting input instruction,
wherein the user interface receives the setting information input on the output setting screen, and
wherein the network interface transmits the input setting information to the external apparatus together with the file identification information of the selected output-target file and causes the external apparatus to store the file identification information and the setting information in the output setting file in association with each other.

9. The image processing apparatus according to claim 8, wherein the circuitry displays, in the output setting screen, a storage instruction image for instructing the setting information to be stored if a user who is authorized to store the output-target file logs in,
wherein the user interface receives the setting information input on the output setting screen and then receives, through the storage instruction image, a storage instruction indicating that the setting information is to be stored, and
wherein the network interface transmits, in response to receiving the storage instruction, the input setting information to the external apparatus together with the file identification information of the selected output-target file.

10. The image processing apparatus according to claim 8, wherein, when the selected output-target file includes a plurality of output-target files, the external apparatus is caused to store, for each one of the plurality of output-target files, the file identification information and the setting information in the output setting file.

11. An image processing system comprising:
an image processing apparatus including a network interface to receive an output-target file and an output setting file and circuitry to set an output setting; and
an information processing apparatus connected to the image processing apparatus via a network,
the information processing apparatus including:
a memory configured to store, in a folder, the output-target file and an output setting file, the output setting file associating file identification information for identifying the output-target file with setting information to be set when the output-target file is output; and
a transmitter configured to transmit the output-target file and the output setting file to the image processing apparatus, and
the image processing apparatus including:
a receiver configured to receive the output-target file and the output setting file from the information processing apparatus, and
circuitry configured to
set an output setting in accordance with the setting information associated with the file identification information of the output-target file, and
output the output-target file in accordance with the output setting that is set,
wherein the network interface receives, from an external apparatus, a file list containing file identification information identifying each of a plurality of output-target files stored in a folder at the external apparatus, and an output setting file stored in the folder and containing file identification information identifying the output-target file to be set with setting information indicated by the output setting file, and
wherein the circuitry
compares the file identification information contained in the output setting files with the file identification information contained in the file list, and
when the file identification information contained in the output setting file matches any one of the file identification information contained in the file list,
for each one or more items of file identification information that match, attaches setting presence information indicating a presence of the setting information to an image of the output-target file indicated by the file identification information that matches, and displays, on the display, the image of the output-target file that is attached with the setting presence information.

12. The image processing system according to claim 11, wherein the memory of the information processing apparatus stores a plurality of output-target files and a plurality of output setting files, each output setting file being stored in the folder in which a corresponding output-target file is being stored.

13. The image processing system according to claim 12, wherein the output setting file associates setting information to be set when the output-target file is output, in association with the output-target file being stored in the same folder.

14. An image processing method, performed by an information processing apparatus connected to an external apparatus via a network, the method comprising:
receiving an output-target file and an output setting file from the external apparatus, the output setting file associating file identification information for identifying the output-target file with setting information to be set when the output-target file is output;
setting an output setting in accordance with the setting information associated with the file identification information of the output-target file; and
outputting the output-target file in accordance with the output setting that is set,
receiving from the external apparatus, a file list containing file identification information identifying each of a plurality of output-target files stored in a folder at the external apparatus, and an output setting file stored in the folder and containing file identification information identifying the output-target file to be set with setting information indicated by the output setting file, comparing the file identification information contained in the output setting files with the file identification information contained in the file list, and when the file identification information contained in the output setting file matches any one of the file identification information contained in the file list, for each one or more items of file identification information that match, attaching setting presence information indicating a presence of the setting information to an image of the output-target file indicated by the file identification information that matches, and displaying, on the display, the image of the output-target file that is attached with the setting presence information.

* * * * *